Figure 1:
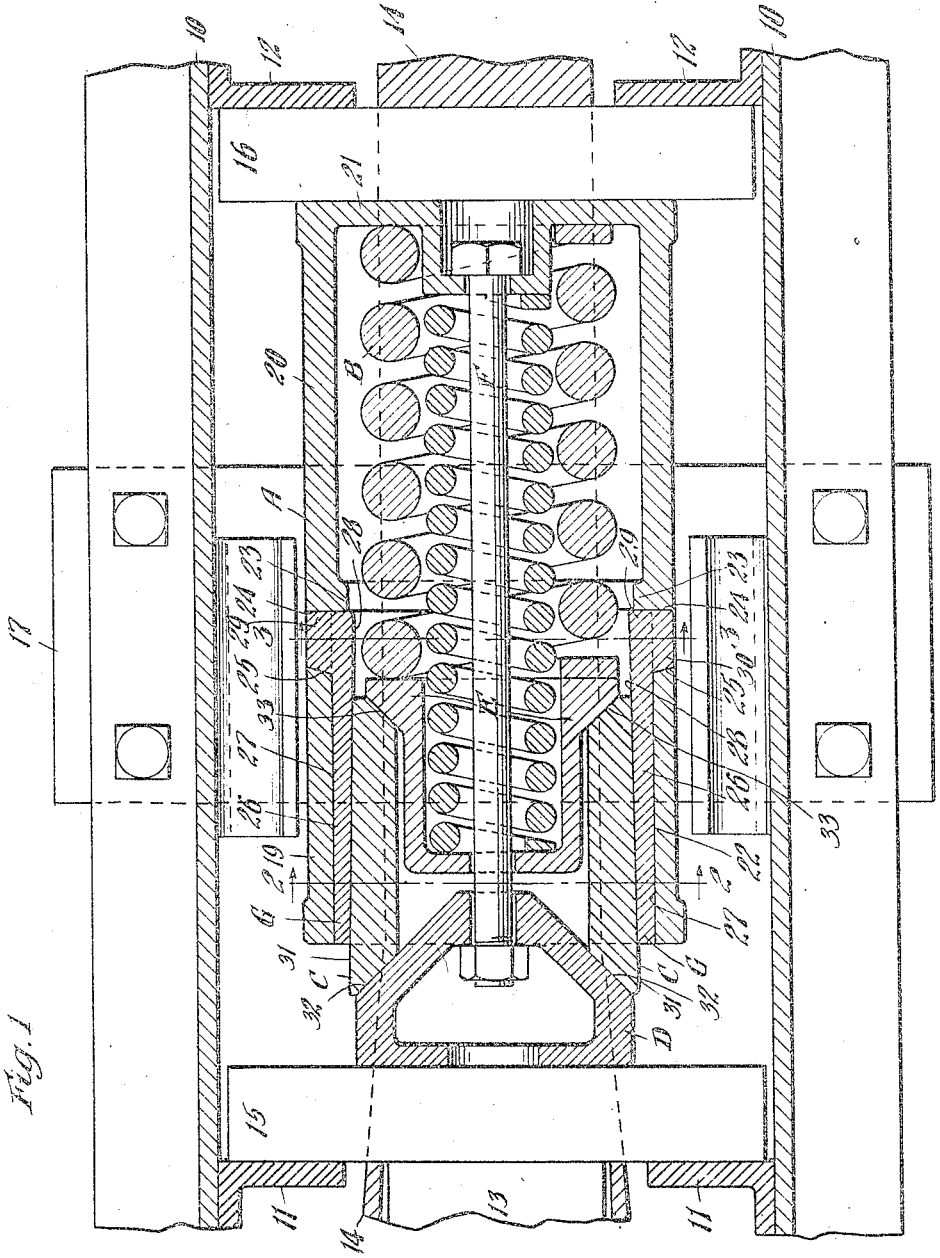

Jan. 13, 1925.  1,522,538
J. F. O'CONNOR
FRICTION SHOCK ABSORBING MECHANISM
Filed Jan. 15, 1923  2 Sheets-Sheet 1

Witnesses
Wm. Geiger

Inventor
John F. O'Connor
By George J. Haight
His Atty.

Jan. 13, 1925.                                                     1,522,538
J. F. O'CONNOR
FRICTION SHOCK ABSORBING MECHANISM
Filed Jan. 15, 1923        2 Sheets-Sheet 2
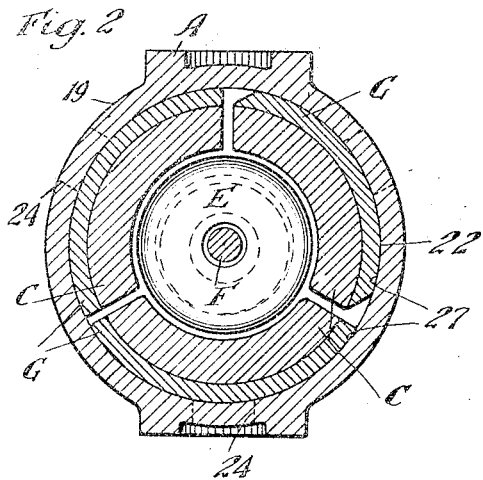
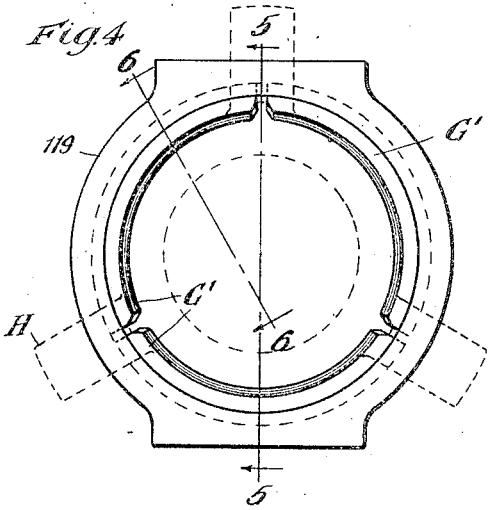
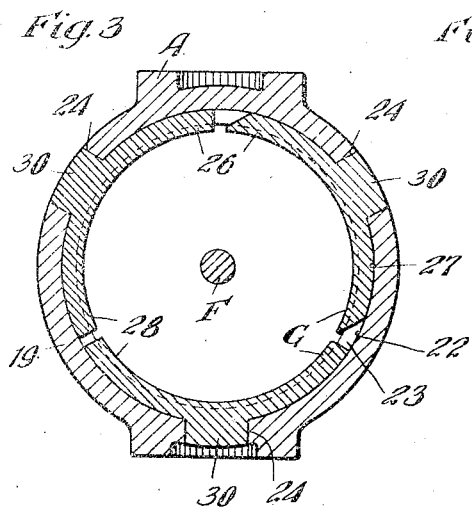
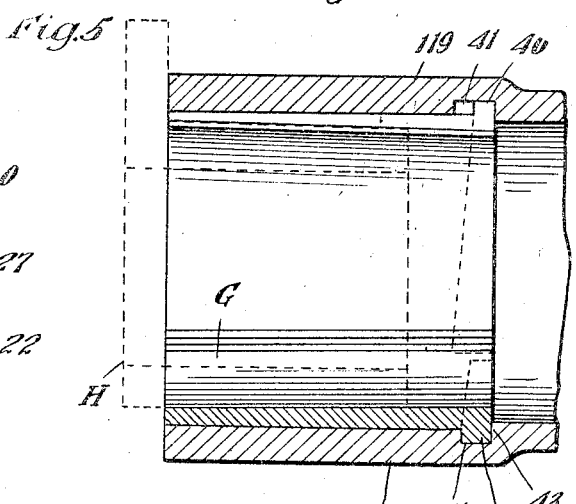
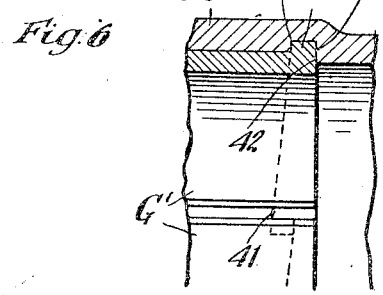
Inventor
John F. O'Connor Patented Jan. 13, 1925.

1,522,538

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 15, 1923. Serial No. 612,652.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following a full, clear, concise, and exact description, reference being had to the accompanying drawings, forming a part of this specification.

This invention relates to improvements in friction shock absorbing mechanisms.

The object of the invention is to provide a friction shell having a renewable liner of an efficient design and more particularly a friction shell of the cylindrical type wherein the liner is utilized to provide a plurality of true cylindric friction surfaces converged inwardly of the shell.

In the drawings forming a part of this specification, Figure 1 is a longitudinal sectional view of a portion of a railway draft rigging showing my improvements in connection therewith, the section through the friction shock absorbing mechanism proper corresponding to two intersecting planes at an angle of 120° to each other. Figures 2 and 3 are vertical transverse sectional views of the shock absorbing mechanism proper corresponding to the lines 2—2 and 3—3 respectively of Figure 1. Figure 4 is a front end elevation of a friction shell employing another form of my invention. In this figure, certain dotted lines indicate a spanner wrench employed in applying the liner sections. Figure 5 is a broken longitudinal sectional view of the shell shown in Figure 4 and corresponding to the line 5—5 thereof. And Figure 6 is a detail sectional view corresponding to the section line 6—6 of Figure 4.

In said drawings, and referring first to the construction illustrated in Figures 1, 2 and 3, 10—10 denote the usual channel draft sills of a car underframe, to the inner faces of which are secured front stop lugs 11 and rear stop lugs 12. A portion of a draw bar is indicated at 13, the same being operatively associated with the shock absorbing mechanism proper and front and rear followers 15 and 16 respectively. The yoke and parts therewithin are supported in operative position by a detachable saddle plate 17.

The improved shock absorbing mechanism proper, as shown, comprises, broadly, a friction shell A; a spring resistance B; a plurality of friction shoes C—C; an outer pressure-transmitting wedge D; an inner combined wedge and spring cap E; and a retainer bolt F.

The shell A, as shown, comprises a casting 18 providing, at its front or outer end, an outer casing 19 and rearwardly thereof, a spring cage 20. At its rear end, the casting is formed with an integral transverse wall 21 which bears upon the follower 16. The casing section 19 has an interior cylindric surface 22 at the inner end of which is an annular inwardly extending shoulder 23. Adjacent the shoulder 23 and just forwardly thereof, are a plurality of radially extending openings 24—24, the front edges 25 of which are beveled as best indicated in Figure 1.

The liner for the casing, to complete the friction shell proper, consists of three liner sections G—G. Each of said sections comprises a main longitudinally extending web 26 of arcuate cross-section and the outer face of which, 27, is cylindric and adapted to fit a corresponding portion of the casing cylindrical surface 22. On its inner side, each liner section G is provided with a cylindric friction surface 28, the latter being inclined, however, at an acute angle with respect to the axis of the mechanism. In this manner, I provide what may be termed three separate cylindric friction surfaces converged inwardly of the shell so as to maintain true surface contact with corresponding cylindric friction surfaces of the shoes C, hereinafter described. The inner shouldered ends 29 of the liner sections bear upon the annular shoulder 23 of the casing so that a wide bearing is obtained for the liner sections. Near their inner ends, the liner sections G are provided with radially outwardly extended heavy lugs 30, each of such size and shape as to snugly fit a corresponding opening 24 of the casing.

As shown, the shoes C are three in number, each having an outer cylindric friction surface 31 engaging a liner friction surface 28 and fitting with a surface contact thereagainst. The shoes C are provided with wedge faces 32 and 33 at their front and inner ends respectively and with which cooperate corresponding wedge faces provided on the outer wedge D and the wedge spring cap E, respectively. As shown, all of the wedge faces 32 and 33 extend at the same angle with respect to the axis of the mechanism but, as will be understood by those skilled in the art, variations in the angle of these wedge faces may be made in accordance with the desired operation of the mechanism. The wedge spring cap E bears upon the front ends of the two coils of the spring resistance, said wedge spring cap being cup-shaped to accommodate the inner coil, as clearly appears from Figure 1. The parts are held in assembled relation by the retainer bolt F in a well-known manner.

In the arrangement shown in Figures 4, 5 and 6, the construction of the outer casing is generally the same as that previously described in connection with Figures 1, 2 and 3. Three liner sections G' are employed, each having an outer cylindric surface with its axis parallel to the axis of the mechanism and an inner cylindric friction surface inclined at an acute angle with respect to said axis as in the case of the previously described form. In the arrangement of Figures 4, 5 and 6, however, each liner section G', at its inner end, has an outer beveled or heavy thread-like flange 40, said flanges 40 being adapted to enter and be tightly wedged in correspondingly shaped grooves or recesses 41 provided on the inner side of the casing proper 119. The inner edges 42 of the liner sections are maintained perpendicular to the axis of the mechanism so that they will have an extended bearing contact with a corresponding annular shoulder 43 provided on the casing. In actual practice, the liner sections G' will be inserted by hand within the casing and turned approximately to their final position. To wedge the flanges 40 tightly within the recesses 41, I may then employ a spanner H fitting within the liner sections and by which the latter may be given a final turning movement to thereby wedge the flanges 40 snugly within the recesses 41.

I have herein shown and described what I now consider the preferred manner of carrying out my invention, but the same is merely illustrative and I contemplate all changes and modifications that come within the scope of the claims appended hereto.

I claim:

1. A friction shell including: an outer casing having an interior cylindrical surface and open at one end; and a liner for said end of the casing comprising, a plurality of sections, each section having an outer cylindrical face fitting a portion of the cylindrical inner face of the casing, an inner longitudinally extending cylindrical friction surface arranged at an acute angle with respect to the axis of the shell; and an out-turned projection near its inner end, the casing being correspondingly recessed to receive said projections.

2. A friction shell including: an outer casing having an interior cylindrical surface and open at one end; a liner for said end of the casing comprising, a plurality of sections, each section having an outer cylindrical face fitting a portion of the cylindrical inner face of the casing, an inner longitudinally extending cylindrical friction surface arranged at an acute angle with respect to the axis of the shell; and an out-turned projection near its inner end, the casing being correspondingly recessed to receive said projections, said casing having an interior annular shoulder at the inner ends of and engaged by said liner sections.

3. A friction shell including: an outer casing having an open end; and a liner for said open end of the casing comprising a plurality of sections, each section having an outer face engaging a portion of the inner face of the casing, an inner longitudinally extending friction surface, and an out-turned, transverse wedge projection, the casing being correspondingly recessed to receive said projection.

4. A friction shell including: an outer casing having an open end and provided on the interior thereof with an inwardly extended bearing shoulder; and a liner for said casing comprising a plurality of sections, each section having an outer face engaging a portion of the inner face of the casing, an inner longitudinally extending friction surface, the inner ends of the sections bearing upon said shoulder and said sections and casing having inter-engaging wedge locking means thereon adapted to effectively interlock the same upon relative rotation thereof.

5. A friction shell including: an outer casing having an open end and inner surfaces extending parallel to the axis of the shell; and a liner for the open end portion of said casing comprising, a plurality of sections, each section having an outer face fitting a portion of the inner surface of the casing; an inner longitudinally extending friction surface inclined at an acute angle with respect to the axis of the shell, and a transversely extending tapered rib, the casing being provided with internal, transversely disposed, tapered slots adapted to receive said projections.

In witness that I claim the foregoing I have hereunto subscribed my name this 11th day of January, 1923.

JOHN F. O'CONNOR.

Witnesses:
FRANCES SAVAGE,
HARRIETTE M. DEAMER.